(12) United States Patent
Kraus et al.

(10) Patent No.: US 12,478,986 B2
(45) Date of Patent: Nov. 25, 2025

(54) NOZZLE CENTRIFUGE HAVING A NOZZLE MONITORING DEVICE AND METHOD FOR MONITORING NOZZLES OF A NOZZLE CENTRIFUGE

(71) Applicant: GEA MECHANICAL EQUIPMENT GMBH, Oelde (DE)

(72) Inventors: Alexander Kraus, Oelde (DE); Rüdiger Göhmann, Oelde (DE)

(73) Assignee: GEA Mechanical Equipment GmbH, Oelde (DE)

( * ) Notice: Subject to any disclaimer, the term of this patent is extended or adjusted under 35 U.S.C. 154(b) by 854 days.

(21) Appl. No.: 17/778,529

(22) PCT Filed: Nov. 10, 2020

(86) PCT No.: PCT/EP2020/081618
§ 371 (c)(1),
(2) Date: May 20, 2022

(87) PCT Pub. No.: WO2021/099182
PCT Pub. Date: May 27, 2021

(65) Prior Publication Data
US 2022/0410179 A1     Dec. 29, 2022

(30) Foreign Application Priority Data
Nov. 21, 2019 (DE) .................... 10 2019 131 509.3

(51) Int. Cl.
*B04B 11/04* (2006.01)
*B04B 1/10* (2006.01)
(Continued)

(52) U.S. Cl.
CPC ................ *B04B 11/04* (2013.01); *B04B 1/10* (2013.01); *B04B 7/06* (2013.01); *B04B 13/00* (2013.01)

(58) Field of Classification Search
CPC .. B04B 11/04; B04B 1/10; B04B 7/06; B04B 13/00; G01M 13/00
See application file for complete search history.

(56) References Cited

U.S. PATENT DOCUMENTS 4,740,077 A * 4/1988 Goodwill .............. B04B 5/0421
356/427
6,328,897 B1 * 12/2001 Leung ..................... B04B 13/00
210/744
(Continued)

FOREIGN PATENT DOCUMENTS

CN     216432607 U * 5/2022
DE     69811153 T2    12/2003
(Continued)

OTHER PUBLICATIONS

International Search Report mailed Jan. 29, 2021 in related/corresponding International Application No. PCT/EP2020/081618.
(Continued)

*Primary Examiner* — Duane Smith
*Assistant Examiner* — Shuyi S. Liu
(74) *Attorney, Agent, or Firm* — PATENT PORTFOLIO BUILDERS PLLC

(57) ABSTRACT

A nozzle monitoring device for a continuously operating nozzle centrifuge, in particular a nozzle separator, which includes a housing, in which a drum which has a defined number of nozzles on a periphery of the drum is arranged so as to be rotatable about a vertical rotational axis is provided. The nozzle monitoring device has at least one sensor and a control unit. The nozzle monitoring device is configured as an optical nozzle monitor with at least one stroboscope and at least one camera. The at least one camera forms the at least one sensor.

18 Claims, 6 Drawing Sheets

(51) Int. Cl.
*B04B 7/06* (2006.01)
*B04B 13/00* (2006.01)

(56) References Cited

U.S. PATENT DOCUMENTS

| | | | |
|---|---|---|---|
| 2001/0054581 | A1 | 12/2001 | Bertolotti et al. |
| 2003/0008758 | A1* | 1/2003 | Astheimer ............ B08B 9/0813 494/56 |
| 2019/0143342 | A1* | 5/2019 | Sundin .................... G01P 15/09 192/136 |

FOREIGN PATENT DOCUMENTS

| | | | |
|---|---|---|---|
| DE | 102005028825 | A1 | 12/2006 |
| EP | 2835178 | A1 | 2/2015 |
| EP | 3260205 | A1 | 12/2017 |
| JP | S63140801 | A * | 6/1988 |
| JP | 3240728 | B2 * | 12/2001 |
| WO | 2009137480 | A1 | 11/2009 |
| WO | 2011081531 | A1 | 7/2011 |

OTHER PUBLICATIONS

Search Report created Jul. 20, 2020 in related/corresponding DE Application No. 10 2019 131 509.3.
Written Opinion mailed Jan. 29, 2021 in related/corresponding International Application No. PCT/EP2020/081618.

* cited by examiner

NOZZLE CENTRIFUGE HAVING A NOZZLE MONITORING DEVICE AND METHOD FOR MONITORING NOZZLES OF A NOZZLE CENTRIFUGE

BACKGROUND AND SUMMARY OF THE INVENTION

Exemplary embodiments of the invention relate to a nozzle centrifuge having a nozzle monitoring device and a method for monitoring nozzles of a nozzle centrifuge.

Such nozzle centrifuges are, for example, disc separators with nozzles in the periphery of the drum. These nozzle centrifuges clarify solids or separate two liquid phases and, if necessary, solids from a 3-phase suspension, which are continuously discharged through the nozzles in concentrated form. Nozzle centrifuges are excellently suited for processing comparatively high solids concentrations in the feed stream. These nozzle centrifuges are comparatively robust and exhibit very good clarification due to the flow conditions. However, a major potential weakness of all nozzle centrifuges is the risk of nozzle clogging. In addition, there are processes in which the nozzle diameter increases due to abrasion, resulting in poorer separation/clarification results.

There are several possible solutions for detecting clogged nozzles.

One solution is to monitor the vibration of the entire machine. If a nozzle becomes clogged and there is a resulting imbalance, these are detected by a measuring sensor. However, it is not possible to determine the exact position of the clogged nozzle within the drum.

Furthermore, there are sensors that are positioned in the area of a nozzle jet and are in connection with a synchronization of the drum speed, wherein the exact position of a clogged nozzle can be detected.

Document EP 3 260 205 A1 describes a sensor device for a centrifugal separator having a stationary housing and a centrifugal rotor provided in the stationary housing and arranged to rotate about an axis of rotation at a rotational speed and including a plurality of nozzles for discharging a product from the centrifugal rotor. The sensor device includes a transfer element having a first part and a second part, and configured to be mounted such that the first part is located inside the stationary housing and outside the centrifuge rotor, and such that the second part is located outside the stationary housing. At least the first part of the transfer element has an elongated shape, a receiving head formed by the first part of the transfer element. The sensor device further comprises a sensor element mounted to the second part of the transfer element and configured to sense vibrations and/or shock pulses propagating from the receiving head to the sensor element, and an evaluation unit connected to the sensor element for transmitting signals from the sensor element to the evaluation unit. The transfer element is mounted in the stationary housing, which is oriented so that the face of the receiving head faces the passing jets of the nozzles during rotation of the rotor.

Exemplary embodiments of the invention are directed to an improved nozzle monitoring device, wherein clogging and partial clogging of one or more nozzles can be easily detected.

Exemplary embodiments are also directed to an improved nozzle centrifuge.

Exemplary embodiments are further directed to an improved method for monitoring nozzles of a nozzle centrifuge.

A nozzle monitoring device of a continuously operating nozzle centrifuge, in particular nozzle separator, according to the invention comprises a housing in which a drum, which has a defined number of nozzles on a periphery of the drum, is arranged so as to be rotatable about a vertical rotational axis, wherein the nozzle monitoring device has at least one sensor and a control unit. The nozzle monitoring device is configured as an optical nozzle monitor having at least one stroboscope and at least one camera, wherein the at least one camera forms the at least one sensor.

By means of this monitoring device, a clogged or partially clogged nozzle can be advantageously detected. In addition, an increase in nozzle diameter can also be detected. A particular advantage is that the monitoring device is an optical nozzle monitor and thus operates without contact.

A nozzle centrifuge according to the invention, in particular a nozzle separator, comprises a housing in which a drum having a defined number of nozzles at a periphery of the drum is rotatably arranged about a vertical rotational axis, and a nozzle monitoring device, wherein at least a portion of the nozzle monitoring device is in contact with an interior of the housing. The nozzle monitoring device is disclosed above.

The advantage here is that the nozzle monitoring device, as a compact unit, is in contact with the interior of the housing but, in contrast to the prior art, is not touched or soiled by a nozzle jet.

A method according to the invention for monitoring nozzles of a nozzle centrifuge having a nozzle monitoring device is provided, wherein the nozzle centrifuge comprises a housing in which a drum having a defined number of nozzles at a periphery of the drum is rotatably arranged about a vertical rotational axis, wherein a stroboscope, a camera and an illumination are arranged in a monitoring chamber so as to be directed to the periphery of the drum with the nozzles. The method comprises the method steps of emitting light pulses from the stroboscope onto the periphery of the rotating drum with the nozzles and adjusting the frequency of the light pulses on the basis of a rotational frequency of the drum and synchronizing with this; capturing a synchronized and thus apparently stationary image sequence of the drum including a respective nozzle jet of the associated nozzle by means of the camera; and comparing the image sequences captured by the camera with previously stored image sequences and evaluating the captured image sequence on the basis of the comparison for monitoring the nozzle.

Instead of image sequences, single images can also be used.

This enables advantageous non-contact optical monitoring of the nozzles.

In one embodiment, the nozzle monitoring device has illumination. This allows the ambient conditions of brightness and detectability in the area to be detected to be improved in a simple manner.

A further embodiment provides that the nozzle monitoring device has a sight glass. This can provide advantageous protection of the nozzle monitoring device against contamination.

An advantageously self-contained unit may be formed, on the one hand, when the at least one stroboscope, the at least one camera, and the illumination are mounted in a monitoring chamber, and, on the other hand, when the at least one stroboscope, the at least one camera and the illumination are arranged in a monitoring chamber above the sight glass, with the sight glass being mounted in an opening of the monitoring chamber.

In this case, in an alternative embodiment, it may be advantageous that the at least one camera and the illumination are arranged in a monitoring chamber above the sight glass, wherein the sight glass is mounted in an opening of the monitoring chamber, and wherein the at least one stroboscope is arranged outside the monitoring chamber, since in this way glare effects of the sight glass can be excluded.

In another embodiment, the sight glass is designed as a rotating sight glass having a sight glass drive. This is advantageous as it prevents contamination by splashes and the like and ensures that the outside of the sight glass is always clean.

In a still further embodiment, the control unit of the nozzle monitoring device controls the sight glass drive, the at least one stroboscope, the at least one camera, and the illumination. This results in a compact unit, wherein the control unit may have a coherent software for control, which is fast due to the compactness of the program steps.

In one embodiment, the at least one camera is connected to an evaluation unit of the control unit, wherein the evaluation unit recognizes and evaluates images captured by the at least one camera by means of image recognition software. Image recognition software is commercially available on the market in high quality, e.g., from the field of automotive technology.

It is advantageous if the nozzle monitoring device has at least one cleaning device, as this allows the functional units of stroboscope, camera, and illumination as well as the sight glass to be cleaned quickly in a simple manner.

In one embodiment, the nozzle monitoring device is arranged on or in the housing, wherein the stroboscope, the camera, and the illumination either partially protrude into a housing wall of the housing in an upper housing section through openings therein or are completely arranged in said upper housing section and directed toward the periphery of the drum with the nozzles. This is advantageous because a range of use of the nozzle monitoring device for different nozzle centrifuges is thus increased.

One embodiment of the nozzle centrifuge provides that the sight glass is the at least one section of the nozzle monitoring device that is in contact with the interior of the housing. This allows a simple compact design to be achieved.

If the monitoring chamber is located on or in an upper housing section of the housing above the periphery of the drum with the nozzles, contamination is reduced and, in addition, visual monitoring of the nozzles from above is possible in a simple manner.

For an advantageous detection of the nozzles and the nozzle jets, it is provided that the stroboscope, the camera, and the illumination are arranged in the monitoring chamber in such a way that they are directed through the sight glass onto the periphery of the drum with the nozzles.

In a further embodiment of the nozzle centrifuge, a corresponding number or marking or even a suitable symbol is visibly attached or engraved on the drum for each nozzle. This is advantageous for easy assignment of the nozzle to the nozzle et during image recognition/evaluation.

In one embodiment of the method, it is provided that in the method step of detecting a frequency of the light pulses of the stroboscope slightly deviating from the rotational frequency of the drum is selected in order to allow the image sequence of the drum generated by the camera, which is now no longer synchronized, to move on to the next nozzle in order to successively detect images of all nozzles of the drum. In this way, each nozzle can be easily monitored.

A further embodiment of the method provides for the use of image-recognizing software in the method step of comparing and evaluating, wherein in the event of a change in one or more nozzle jets of one or more nozzles, an output for automatic influencing of the nozzle centrifuge or/and a display for an operator takes place. This is of particular advantage, since a quick detection and notification of clogged, partially clogged or enlarged nozzles can be made.

For this purpose, it is particularly advantageous that a nozzle jet can be clearly assigned to a nozzle and the nozzles identified by a corresponding number or marking applied or engraved on the drum, or also by a suitable symbol next to the respective nozzle.

A further advantage arises if a fast and automatic detection can take pace in the method step of detection, comparison, and evaluation, which can then be used to suspend the solids feed. After a stop of the rotating drum, the clogged, partially clogged, or enlarged nozzle can then be changed in a targeted manner.

In an even further embodiment, the illumination can additionally be used in the method step of detection to improve image capture. This results in the advantage of improved image capture adapted to different boundary conditions in the monitored area.

A further advantage arises if, in the method step of detecting, a cleaning device of the nozzle monitoring device is additionally used to improve an image capture.

BRIEF DESCRIPTION OF THE DRAWING FIGURES

In the following, the invention is explained in more detail by means of exemplary embodiments with reference to the drawings, wherein.

DETAILED DESCRIPTION

Figure 1:
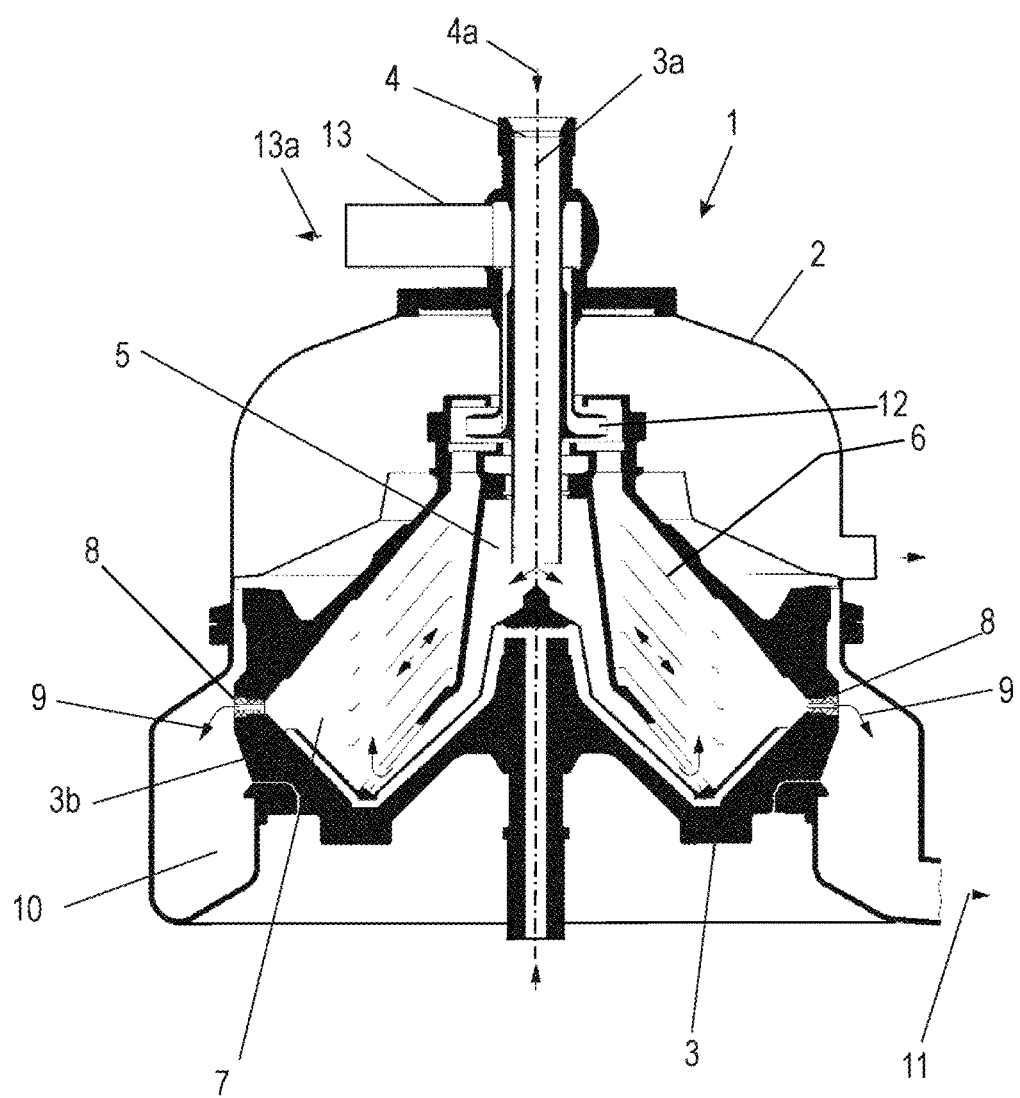
FIG. 1 shows a schematic sectional view of a prior art nozzle centrifuge.

FIG. 1 shows a schematic sectional view of a prior art nozzle centrifuge 1.

The nozzle centrifuge 1 is designed here as a disc separator. It may have a stationary housing or frame 2. The housing 2 accommodates a rotatable drum 3 having a rotational axis 3*a*, which rotates about the rotational axis 3*a* during operation. The drum has an inlet pipe 4, an inlet chamber 5, preferably a disc stack 6 and a centrifugal chamber 7 and nozzles 8 in the periphery 3*b* of the drum 3 for solids discharge. The housing 2 further comprises a discharge chamber 10 (also called "solids trap") with outlet 11. Furthermore, the nozzle centrifuge 1 has a discharge means 12 and a discharge pipe 13 for discharging the liquid phase from the centrifugal chamber 7.

Terms such as "top", "bottom", "front" or "rear" and the like merely refer to the exemplary embodiments shown and are not to be understood as restrictive. For example, in alternative embodiments not shown here, the inlet pipe 4 can also be guided into the drum from "below", although FIG. 1 shows a variant in which the inlet pipe 4 is guided into the drum 3 from above.

The inlet pipe 4 extends along the rotational axis 3a into the inlet chamber 5 arranged centrally in the drum 3. The inlet chamber 5 is open downwards via an undesignated distributor and opens into the centrifugal chamber 7. The centrifugal chamber 7 is surrounded by the drum 3. The disc stack 6, consisting of a plurality of discs, here conical, is arranged in the centrifugal chamber 7.

Via the inlet 4a, a centrifugal material, e.g., a suspension—a mixture of one or more liquids and solids distributed therein—is fed through the inlet pipe 4 into the inlet chamber 5 and the distributor into the centrifugal chamber 7. Solids are to be clarified from the suspension and concentrated and continuously discharged through the nozzles 8. For this purpose, the drum 3 is driven by a drum drive 22 not shown here (see FIG. 5), wherein the drum 3 rotates about the rotational axis 3a.

To realize a discharge of the solids, several nozzles 8 are distributed here on the outer circumference (periphery 3b) of the drum 3 or the centrifugal chamber 7. The concentrate discharge takes place as a nozzle jet 9 through the respective nozzles 8 and collects in the discharge chamber 10, which is emptied through the outlet 11. The nozzles 8 are preferably permanently open during operation and can permanently discharge solids during operation.

At least one liquid phase is discharged at the upper end of the drum 3 through at least one or more discharge means 12 into a discharge pipe 13 as discharge outlet 13a. The discharge means can be designed as a centripetal pump or gripper. However, it can also be designed in other ways, such as overflows. With regard to the drum 3, it can be of open or semi-open design or of hermetic or hydrohermetic design.

The concentration in the solids or nozzle discharge, i.e., in the nozzle jets 9, is determined in nozzle centrifuges by the following parameters:
a) concentration of the solids in the inlet 4a,
b) number of nozzles 8,
c) diameter of the nozzles 8 and
d) speed of the drum 3.

The passage of a nozzle 8 may be reduced or even blocked by the high solids concentration in the nozzle jet 9, e.g., by constriction or blockage.

If, for example, in a case of eighteen nozzles 8, one, i.e., 1/18 of the nozzles 8, is blocked, the nozzle capacity—assuming a constant concentration of solids in the inlet 4a and a constant rotational speed of the drum 3—decreases by 1/18. As a result, assuming that the clarification of the suspension remains equally good, the residence time of the solids in the centrifugal chamber increases, which then leads to overfilling of the centrifugal chamber with solids. This increases the risk of an unacceptable imbalance of the drum 3 and also further nozzle clogging.

Figure 2:
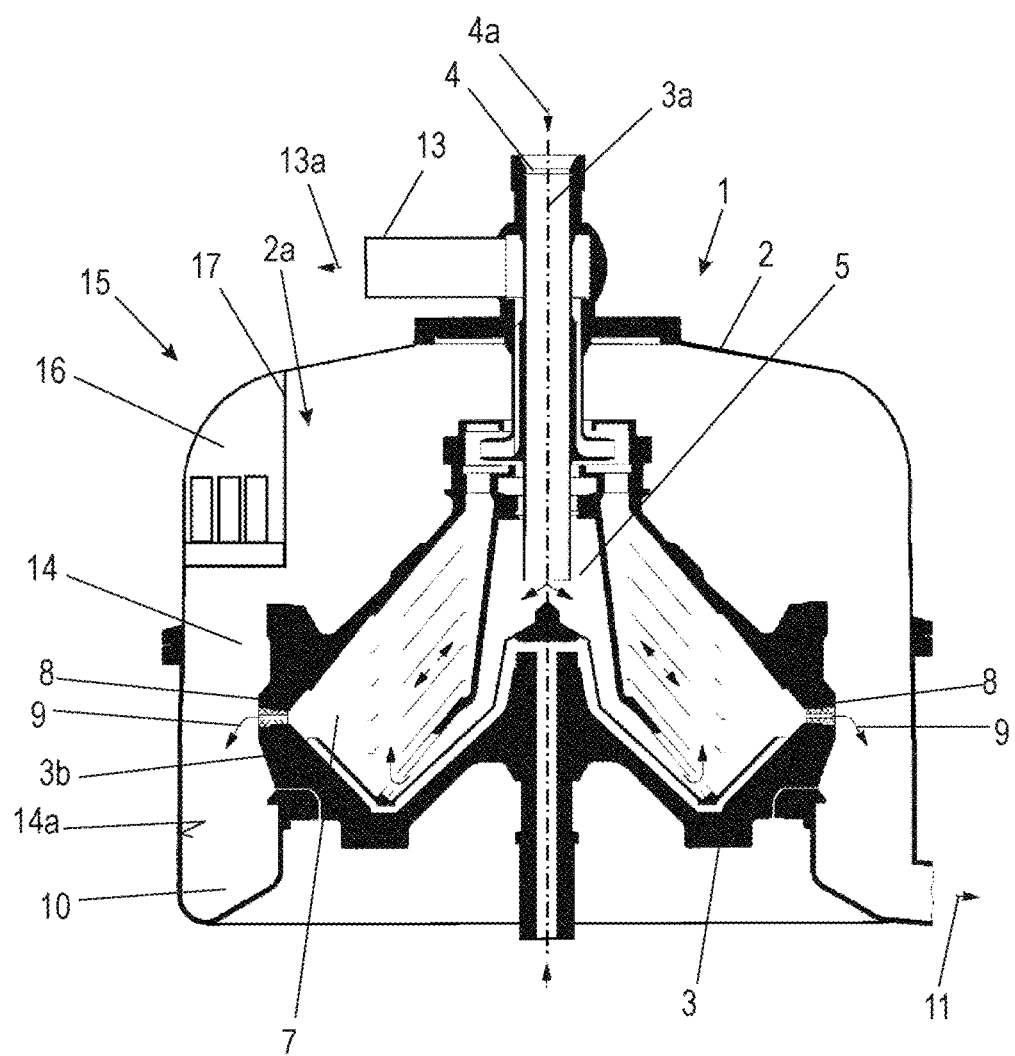
FIGS. 2-3 show schematic sectional views of a nozzle centrifuge according to the invention with a nozzle monitoring device according to the invention.
Figure 3:
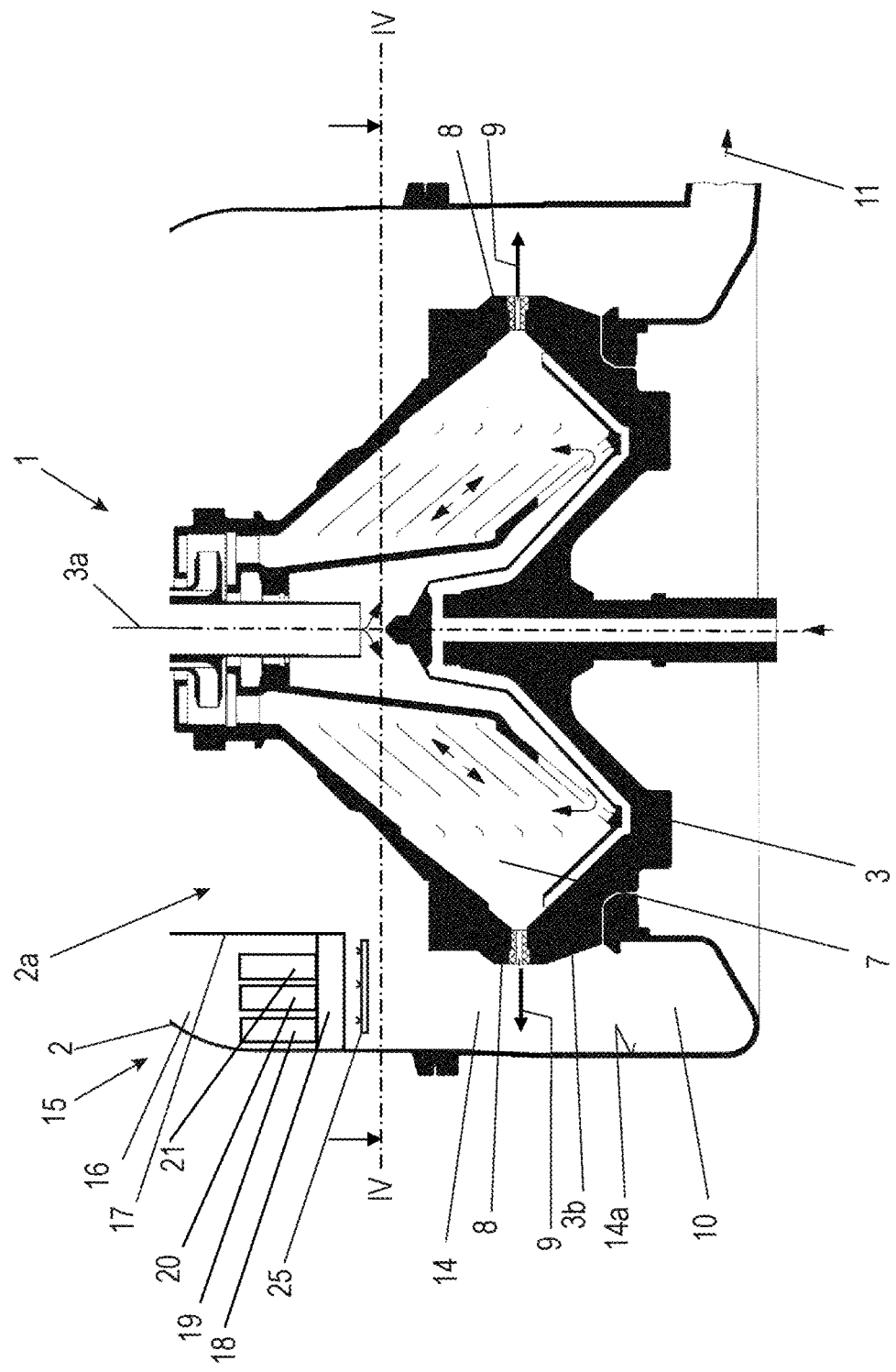

FIG. 2 shows a schematic sectional view of a nozzle centrifuge 1 according to the invention with a nozzle monitoring device 15 according to the invention. FIG. 3 shows an enlarged schematic view of the nozzle monitoring device 15.

Figure 5:
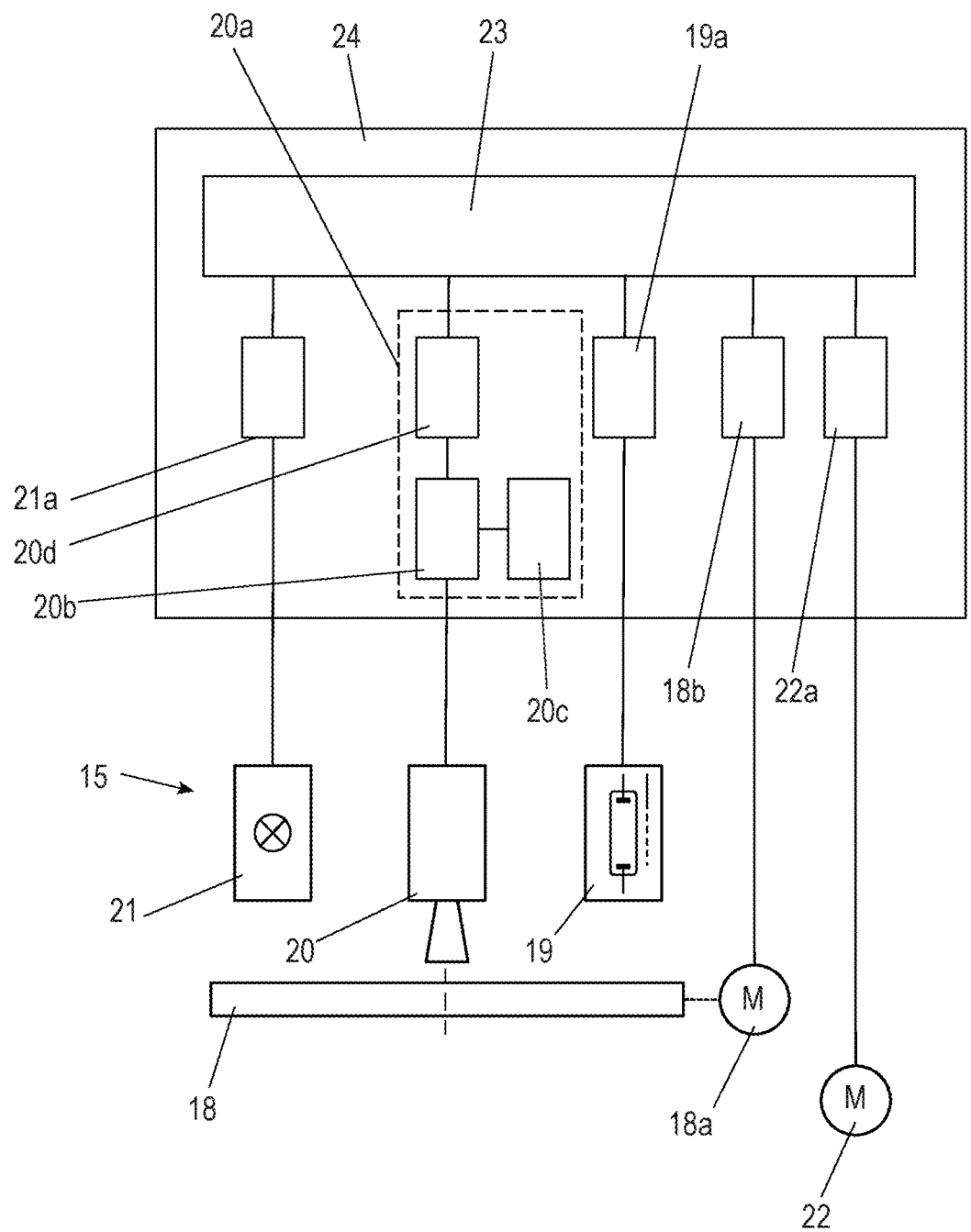
FIG. 5 shows a schematic block diagram of an exemplary control unit.

The nozzle monitoring device 15 is used to monitor the nozzles 8 of the nozzle centrifuge 1 and, in a first exemplary embodiment, comprises at least one stroboscope 19, at least one sensor, which is an optical sensor and is designed as a camera 20, and a control unit 24 (FIG. 5).

In a second exemplary embodiment, the nozzle monitoring device 15 includes an illumination 21.

A third exemplary embodiment provides that here the nozzle monitoring device 15 is arranged in a monitoring chamber 16.

And in a fourth exemplary embodiment, shown in FIGS. 2 and 3, the nozzle monitoring device 15 includes a sight glass 18.

The nozzle monitoring device 15 thus forms an optical monitoring of the nozzles 8 or nozzle jets 9 and is also referred to as a nozzle monitor.

The nozzle monitoring device 15 may be arranges differently on or in the housing 2. For example, it is possible that its functional units of stroboscope 19, camera 20, and illumination 21 are arranged in such a way that they either partially protrude into a housing wall of the housing 2 in an upper housing section 2a through openings therein or are completely arranged in this upper housing section 2a directed toward the periphery 3b of the drum 3 with the nozzles 8. This is not shown, but is easily imaginable.

The nozzle monitoring device 15 is arranged in a monitoring chamber 16 in the third and fourth exemplary embodiments. Here, the monitoring chamber 16 is located inside the housing 2 in the upper housing section 2a on an inner side of the housing 2 above the periphery 3b of the drum 3 with the nozzles 8. A chamber wall 17 surrounds the nozzle monitoring device 15 and separates the monitoring chamber 16 from the inner space of the housing 2 of the nozzle centrifuge 1. In this context, a lower opening of the monitoring chamber 16 is provided through which the functional units are directed to the monitoring space 14.

In the fourth embodiment, the sight glass 18 is mounted in the lower opening of the monitoring chamber 16 and is directed downward into the monitoring space 14 forming a section of the housing 2. Here, the monitoring space 14 is defined between the periphery 3b of the drum 3 with the nozzles 8 and an associated circumferential inside 14a of the housing 2.

The stroboscope 19, the camera 20, and the illumination 21 are arranged in the monitoring chamber 16 in such a way that they are directed through the sight glass 18 into the monitoring space 14. The stroboscope 19, the camera 20 and the illumination 21 may be arranged substantially parallel to the vertical rotational axis 3a of the drum 3.

In addition, the nozzle monitoring device 15 here has a cleaning device 25 which cleans the functional units of stroboscope 19, camera 20 and illumination 21 (in the fourth exemplary embodiment also the sight glass 18) from a suitable position. The cleaning device 25 is here arranged in the interior of the housing 2 and is formed with, for example, spray nozzle(s).

Figure 4A:
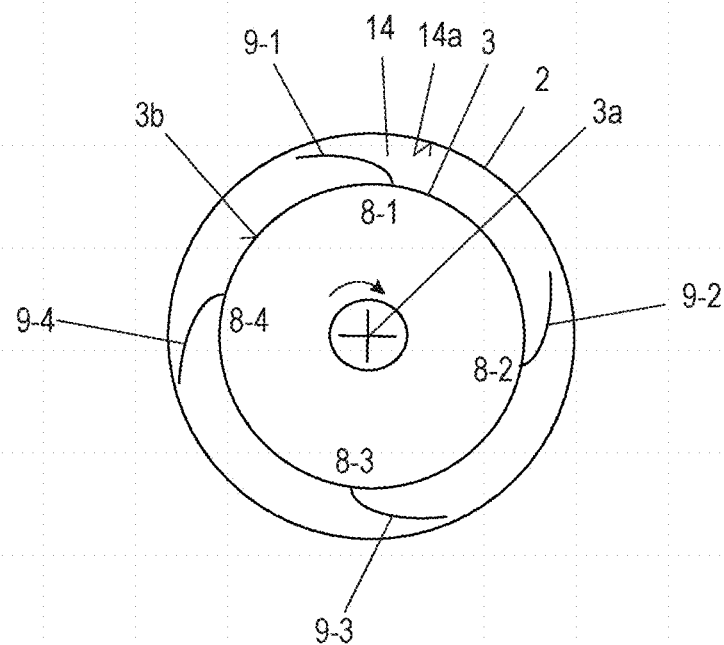
FIGS. 4A-4B show highly schematized sectional views according to line IV-IV of FIG. 3.
Figure 4B:
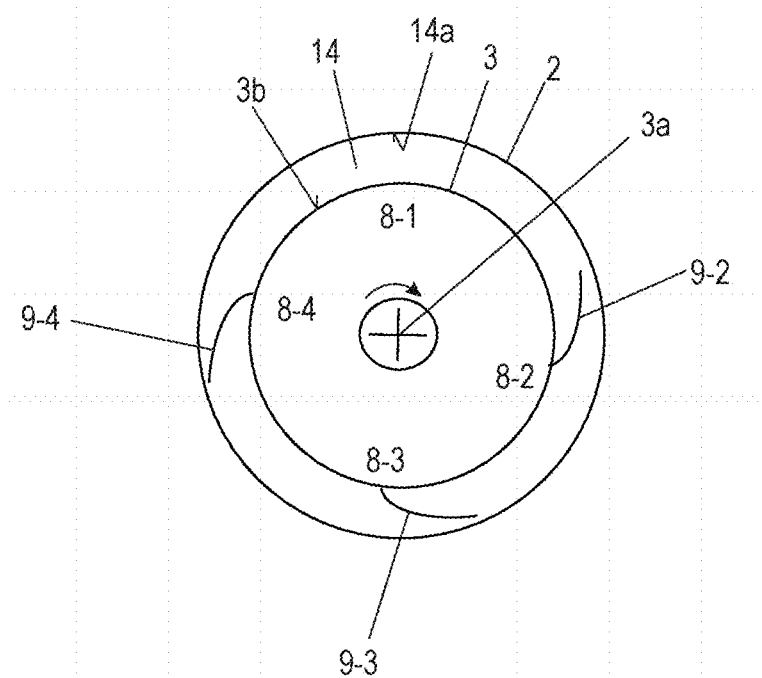

FIGS. 4A-4B showed highly schematized sectional views according to line IV-IV of FIG. 3.

In FIGS. 4A-4B, the rotational axis 3a is perpendicular to the drawing plane. The drum 3 with the periphery 3b extends coaxially to the housing 2 and to the rotational axis 3a. In this schematic sectional view, the periphery 3b of the drum 3 has four nozzles 8-1, 8-2, 8-3, 8-4. It is understood that other numbers of nozzles are also possible. Each nozzle 8-1, 8-2, 8-3, 8-4 is assigned a respective nozzle jet 9-1, 9-2, 9-3, 9-4. Since the drum 3 rotates here clockwise (arrow) about the rotational axis 3a, the nozzle jets 9-1, 9-2, 9-3, 9-4 are deflected accordingly.

In FIGS. 4A-4B, the monitoring space 14 is located in the "12 o'clock" area in each case. Of course, the monitoring space 14 can also be defined at another location. Also, more than one nozzle monitoring device 15 can be provided.

All nozzles 8-1, 8-2, 8-3, 8-4 are unblocked in FIG. 4A, whereby all nozzle jets 9-1, 9-2, 9-3, 9-4 are present and therefore unchanged. The nozzle monitoring device 15 detects the states of all nozzle jets 9-1, 9-2, 9-3, 9-4 in a manner explained in more detail below.

FIG. 4B shows the state when a nozzle 8-1 is blocked. The associated nozzle jet 9-1 is no longer present. The nozzle monitoring device 15 detects the states of all nozzle jets 9-1, 9-2, 9-3, 9-4 and determines the nozzle jet 9-1 that is no longer present. This is described in detail below.

FIG. 5 shows a schematic block diagram of an exemplary control unit 24.

The nozzle centrifuge 1 is provided with a control system. FIG. 5 shows an example of such a control system with the control unit 24, with which the nozzle monitoring device 15 can also be controlled at the same time. It is understood that a control of the nozzle monitoring device 15 can also be carried out separately.

Here, the control unit 24 comprises a central control device 23, which is connected on the one hand to a controller of the nozzle centrifuge 1, for example to its drum drive 22 via a drum drive controller 22a, and on the other hand to the functional groups of the nozzle monitoring device 15.

In the shown fourth exemplary embodiment of the nozzle monitoring device 15, the sight glass 18 is designed as a rotating sight glass 18 with a sight glass drive 18a. With the aid of this rotating sight glass 18, a free view into the interior of the housing 2, in particular into the monitoring space 14 is permanently possible through the sight glass 18, even when the nozzle centrifuge 1 is in operation. The sight glass drive is connected to a sight glass drive controller 18b. The sight glass drive controller 18b supplies the sight glass drive 18a with power and switches the sight glass drive 18a on/off.

The stroboscope 19 has a light source, which may be, for example, a flash lamp/tube (shown in FIG. 5), light-emitting diode, laser diode, etc. This light source is powered and controlled/switched by a stroboscope controller 19a.

Light pulses from the stroboscope 19 are beamed through the sight glass 18 from above into the monitoring space 14 onto the rotating drum 3. A frequency of the light pulses is adjustable by means of the stroboscope controller 19a. The frequency of the light pulses is selected such that an approximately stationary image of the drum 3 including the respective nozzle jet 9-1, 9-2, 9-3, 9-4 of the associated nozzle 8-1, 8-2, 8-3, 8-4 is formed. The images of the drum 3 can be single images or image sequences.

An example will serve this purpose. If the speed n of the drum is n=4500 min$^{-1}$, the frequency f of the light pulses of the stroboscope 19 is set to f=(4500/60) s$^{-1}$=75 Hz. If a slightly different frequency is selected, the image sequence of the drum 3 no longer appears stationary, but slightly "leading" or "lagging". Thus, all nozzles 8-1, 8-2, 8-3, 8-4 with their associated nozzle jets 9-1, 9-2, 9-3, 9-4 "wander" slowly through the image. Visible from above, for each nozzle 8-1, 8-2, 8-3, 8-4, a corresponding number or marking or also a suitable symbol is attached or engraved on the drum 3, so that an assignment to each nozzle 8-1, 8-2, 8-3, 8-4 and associated nozzle jet 9-1, 9-2, 9-3, 9-4 is possible.

With the aid of the camera 20, this still image or the slowly advancing image sequence of the respective nozzle jet 9-1, 9-2, 9-3, 9-4 of the drum 3 is captured in the monitoring space 14 and transmitted directly to a control room, so that an operator can optically evaluate the status of the nozzles 8-1, 8-2, 8-3, 8-4 based on the respective image in real time. This is not shown, but is easily imaginable.

In FIG. 5, an automatic evaluation of the respective image of an image sequence is shown with the aid of an image processing system, wherein in the event of a nozzle blockage, a required action of the control system of the nozzle centrifuge 1 can be triggered.

For this purpose, in this example, the camera 20 is connected to a camera controller 20a. The camera controller 20a includes a comparator 20b, a memory 20c, and an evaluation 20d. The sequence of images captured by the camera 20 is compared by the comparator 20b to one or more images previously stored in the memory 20c. The comparator 20b then transmits a signal corresponding to the comparison, including a nozzle identification, to the evaluation 20d. The evaluation 20d evaluates the received signal, for example by means of image-recognizing software, wherein if a nozzle jet 9 is changed, the corresponding nozzle 8 is determined and a corresponding alarm signal is output. This alarm signal can be indicated visually by warning lamps or/and on a display of the control unit 24 or a higher-level control room. For this purpose, the camera control unit 20a is in communication with the central control device 23, which can also, for example, influence the operation of the nozzle centrifuge 1.

The illumination 21 has a light source, e.g., LED, and is connected to an illumination controller 21a. The illumination controller 21a supplies power to the illumination 21, switches the illumination 21 on/off, and can adjust the illumination level of the illumination 21. The illumination 21 may further be provided with fixed or/and adjustable optics. The illumination 21 can optimize the lighting conditions in the monitoring chamber 14.

In this example of the control unit 24, the central control device 23 is connected to the sight glass drive controller 18b, the stroboscope controller 19a, the camera controller 20a, the illumination controller 21a, and the drum drive controller 22a, and can influence and control these functional groups in an interrelated manner. Thus, the central control device 23 can advantageously influence the stroboscope controller 19a depending on speed data of the drum drive controller 22a with respect to still images and moving images.

In addition, the central control device 23 can perform brightness control of the monitoring area 14 with the illumination 21 by using the camera 20 as a brightness sensor. Of course, another brightness sensor may also be provided.

Furthermore, the nozzle monitoring device 15 may also be attached to the housing 2 of the nozzle centrifuge 1 in such a way that the monitoring chamber 16 is attached outside the housing 2 and only the sight glass 18 is in contact with the interior of the housing 2. In this case, the sight glass 18 may be fixed in an opening of the housing 2 in the upper housing section 2a in such a way that it closes this opening and is aligned with the monitoring space 14.

The stroboscope 19 may also be mounted in the interior of the housing 2 to avoid a negative influence due to glare effects of the rotating sight glass 18. In this case, cleaning of the stroboscope 19 by a spray nozzle or more of the cleaning device 25 is provided.

The cleaning device 25 can be controlled automatically at certain time intervals or also by the central control device 23 depending on the detected brightness in monitoring space 14 described above.

Figure 6:
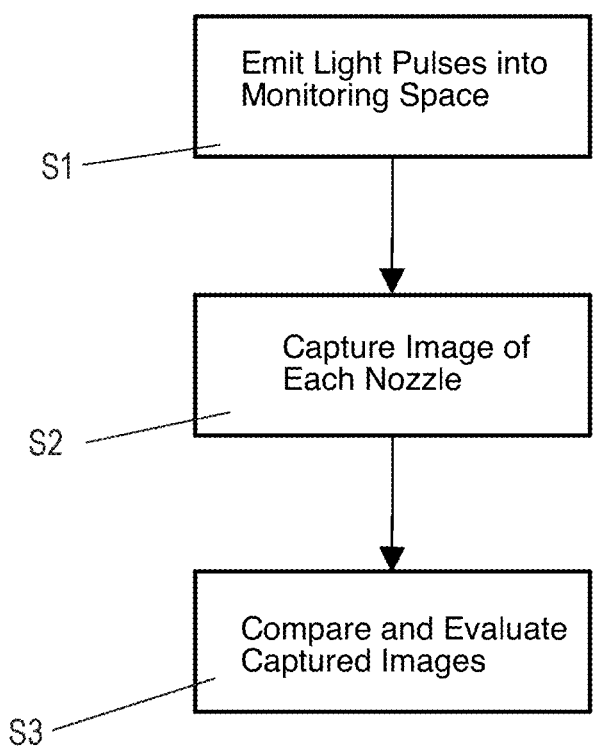
FIG. 6 shows a schematic flow diagram of a method for monitoring nozzles according to the invention.

FIG. 6 shows a schematic flow diagram of a method according to the invention for monitoring nozzles 8 of a nozzle centrifuge 1 with the nozzle monitoring device 15.

In a first method step S1, light pulses are emitted or beamed or projected by the stroboscope 19 into a monitoring space 14 onto the periphery 3b of the rotating drum 3 with the nozzles 8 of the nozzle centrifuge 1. In this case, the frequency of the light pulses is adjusted and synchronized as a function of the rotational speed or rotational frequency of the drum in such a way that an approximately stationary image of the drum 3 including the respective nozzle jet 9-1, 9-2, 9-3, 9-4 of the associated nozzle 8-1, 8-2, 8-3, 8-4 is produced. Thus, a first nozzle 8 with its associated nozzle jet 9 can be monitored. Then a frequency slightly or marginally deviating from the synchronization, e.g., a lower frequency, is selected in order to let the image sequence of the drum 3 move on to the next nozzle 8. In this way, images of all nozzles 8 of the drum 3 can be captured in succession.

Each image of a respective nozzle 8 with its nozzle jet 9, synchronized in this way with the rotational frequency of the drum and thus apparently stationary, is captured by the camera 20 in a second method step S2.

In a third method step S3, the image captured by the camera 20 is compared with a previously stored image for monitoring the nozzles 8 and evaluated. If a change in one or more nozzle jets 9 from one or more nozzles 8 is determined, an output for automatically influencing the nozzle centrifuge 1 or/and a display for an operator is provided. The comparison and evaluation are carried out by means of image-recognizing software.

The illumination 21 can additionally be used in the second method step S2 to improve an image capture. The cleaning device 25 can also be used for this purpose.

The output in the third method step S3 can be a light indicator, an acoustic indicator, an indication on a display, or/and a signal for an automatic influence on the operation of the nozzle centrifuge 1. For example, a display may have the text "Nozzle no. xyz clogged", "Nozzle no. xyz partially clogged", etc.

If a fast and automatic detection takes place in the method steps of detection, comparison, and evaluation, this can then be used to suspend the solids supply to the nozzle centrifuge 1. After stopping the rotating drum 3, the clogged, partially clogged or enlarged nozzle 8 can then be specifically changed.

In this way, the nozzle monitoring device 15 according to the invention provides a non contact optical nozzle monitor for the nozzles 8 of the nozzle centrifuge 1.

The control unit 24 shown in FIG. 5 can also be designed without the drum drive controller 22a as its own, separate control unit 24 of the nozzle monitoring device 15. In this case, the central control device 23 can be connected to the control unit of the nozzle centrifuge 1 via a suitable interface.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Nozzle centrifuge
2 Housing
2a Housing section
3 Drum
3a Rotational axis
3b Periphery
4 Inlet pipe
4a Inlet
5 Inlet chamber
6 Disc stack
7 Centrifugal chamber
8, 8-1, 8-2, 8-3, 8-4 Nozzle
9, 9-1, 9-2, 9-3, 9-4 Nozzle jet
10 Discharge chamber
11 Outlet
12 Discharge means
13 Discharge pipe
13a Discharge outlet
14 Monitoring space
14a inside
15 Nozzle monitoring device
16 Monitoring chamber
17 Chamber wall
18 Sight glass
18a Sight glass drive
18b Sight glass drive controller
19 Stroboscope
19a Stroboscope controller
20 Camera
20a Camera controller
20b Comparator
20c Memory
20d Evaluation
21 Illumination
21a Illumination controller
22 Drum drive
22a Drum drive controller
23 Central control device
24 Control unit
25 Cleaning device
S1, S2, S3 Method step

The invention claimed is:

1. A nozzle centrifuge, comprising:
a drum having a defined number of nozzles on a periphery of the drum;
a housing in which the drum is arranged rotatably about a vertical rotational axis and having an upper housing section; and
a nozzle monitoring device, wherein at least one section of the nozzle monitoring device is in contact with an interior space of the housing, wherein the nozzle monitoring device is arranged on or in the housing, wherein the nozzle monitoring device comprises
a camera;
a stroboscope;
an illuminant; and
a control unit coupled to the camera and stroboscope,
wherein the control unit is configured to control the stroboscope by selecting a frequency of light pulses of the stroboscope that deviates from a rotational frequency of the drum to allow an image sequence of the drum generated by the camera, which is now no longer synchronized, to move on to a next nozzle in order to successively capture images of all nozzles of the drum,
wherein the camera, stroboscope, and the illuminant either
partially protrude into a housing wall of the housing in the upper housing section through openings in the upper housing section, or are completely arranged in the upper housing section and are directed towards the periphery of the drum with the nozzles, and wherein the nozzle monitoring device is an optical nozzle monitor.

2. The nozzle centrifuge of claim 1, further comprising: a sight glass, which is the at least one section of the nozzle monitoring device that is in contact with the interior space of the housing.

3. The nozzle centrifuge of claim 2, further comprising: a monitoring chamber arranged at or in the upper housing section of the housing above the periphery of the drum with the nozzles, wherein the stroboscope, the camera, and the illuminant are mounted in the monitoring chamber.

4. The nozzle centrifuge of claim 3, wherein the stroboscope, the camera, and the illuminant are arranged in the monitoring chamber in such a way that the stroboscope, the camera, and the illuminant are directed through the sight glass onto the periphery of the drum with the nozzles.

5. The nozzle centrifuge of claim 1, wherein the drum includes, for each nozzle, a corresponding visible number, marking, or symbol that is applied to or engraved on the drum.

6. The nozzle centrifuge of claim 3, wherein the camera and the illuminant are arranged in the monitoring chamber above the sight glass, wherein the sight glass is mounted in an opening of the monitoring chamber.

7. The nozzle centrifuge of claim 2, further comprising: a monitoring chamber arranged at or in the upper housing section of the housing above the periphery of the drum with the nozzles, wherein the camera and the illuminant are arranged in the monitoring chamber above the sight glass, wherein the sight glass is arranged in an opening of the monitoring chamber, and wherein the stroboscope is arranged outside of the monitoring chamber.

8. The nozzle centrifuge of claim 3, wherein the sight glass is a rotating sight glass having a sight glass drive.

9. The nozzle centrifuge of claim 8, wherein the control unit is configured to control the sight glass drive, the stroboscope, the camera, and the illuminant.

10. The nozzle centrifuge of claim 9, wherein the camera is connected to an evaluation unit of the control unit, wherein the evaluation unit is configured to recognize and evaluate images captured by the camera by using image-recognizing software.

11. The nozzle centrifuge of claim 1, further comprising: a cleaning device.

12. The nozzle centrifuge of claim 1, wherein the nozzle centrifuge is a continuously operating nozzle centrifuge.

13. A method for monitoring nozzles of a nozzle centrifuge having a nozzle monitoring device, wherein the nozzle centrifuge comprises a housing in which a drum having a defined number of nozzles at a periphery of the drum is rotatably arranged about a vertical rotational axis, wherein a stroboscope, a camera and an illuminant are arranged in a monitoring chamber in such a way that they are directed towards the periphery of the drum with the nozzles, the method comprising:

emitting, by the stroboscope, light pulses to the periphery of the rotating drum with the nozzles, adjusting a frequency of the light pulses based on a rotational frequency of the drum, and synchronizing the emission of light pulses by the stroboscope with the adjusted frequency;

capturing, by the camera, a synchronized, stationary image sequence of the drum including a respective nozzle jet of an associated nozzle; and comparing the captured image sequence with previously stored image sequences and evaluating the captured image sequence based on the comparison to monitor the associated nozzle, wherein the capturing by the camera further comprises selecting a frequency of the light pulses of the stroboscope that deviates from the rotational frequency of the drum to allow the image sequence of the drum generated by the camera, which is now no longer synchronized, to move on to a next nozzle in order to successively capture images of all nozzles of the drum.

14. The method of claim 13, wherein the comparing and evaluating the captured image is performed by image-recognizing software, wherein when there is a change of one or more nozzle jets of one or more nozzles an output for automatically influencing the nozzle centrifuge or a display for an operator takes place.

15. The method of claim 13, wherein assignment of a nozzle jet to a nozzle and an identification the nozzles are based on a corresponding number or marking applied to or engraved on the drum, or by a matching symbol next to the respective nozzle.

16. The method of claim 13, wherein the illuminant is illuminated when the camera captures each image of the stationary image sequence of the drum.

17. The method of claim 13, wherein a cleaning device is operated while capturing images of the stationary image sequence.

18. The method of claim 17, wherein a rapid and automatic capturing is performed in the capturing, comparing, and evaluating to suspend a solids supply to the nozzle centrifuge.

* * * * *